US006774366B1

(12) United States Patent
Friedman et al.

(10) Patent No.: US 6,774,366 B1
(45) Date of Patent: Aug. 10, 2004

(54) IMAGE INTEGRATION AND MULTIPLE LASER SOURCE PROJECTION

(75) Inventors: Melvin H. Friedman, Alexandria, VA (US); John M. Hall, Amherst, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/637,092

(22) Filed: Aug. 7, 2003

(51) Int. Cl.[7] ............................ G01J 1/00; G01B 11/26; G21G 5/00
(52) U.S. Cl. .................. 250/328; 250/342; 250/330; 250/332; 356/153; 359/618; 359/624; 359/636; 359/639; 359/640
(58) Field of Search ................................. 250/342, 328, 250/330, 332, 334; 356/121–123, 135, 153, 137–139, 141.1–141.4; 359/618–620, 624, 627, 628, 633, 639, 640, 737, 741

(56) References Cited

U.S. PATENT DOCUMENTS

| 4,497,065 | A | * | 1/1985 | Tisdale et al. ............... 382/103 |
| 5,047,776 | A | * | 9/1991 | Baller ........................... 342/52 |
| 5,892,575 | A | * | 4/1999 | Marino ........................ 356/5.01 |
| 6,137,566 | A | * | 10/2000 | Leonard et al. ........... 356/141.1 |
| 6,262,800 | B1 | * | 7/2001 | Minor ..................... 356/139.07 |
| 6,359,681 | B1 | * | 3/2002 | Housand et al. ............ 356/4.01 |
| 6,570,168 | B1 | * | 5/2003 | Schultz et al. ............. 250/492.2 |
| 2002/0167655 | A1 | * | 11/2002 | Friedman et al. ............ 356/121 |

* cited by examiner

Primary Examiner—John R. Lee
Assistant Examiner—Bernard E. Souw
(74) Attorney, Agent, or Firm—Arthur K. Samora; William H. Andeson

(57) ABSTRACT

An apparatus and method for enhancing an image relayed by a central beam of collimated light centered on the optical axis of a lens with an aperture area of A and focused on the focal plane of the lens. The apparatus having an aperture at least n times as big as A centered on the optical axis of the lens to admit a collimated relay beam including the central beam and a diverter means for separating the relay beam into n collimated facet beams equal to the central beam, but exclusive thereof, and redirecting them through the lens aperture to produce n additional images on the same focal plane. The apparatus also including a processor with a separate opto-electronic device for each image that converts it between electronic and photonic states, the electronic images being stored in the processor.

21 Claims, 18 Drawing Sheets

IMAGE INTEGRATION AND MULTIPLE LASER SOURCE PROJECTION

RELATED APPLICATIONS

This application is a substitute for patent application Ser. No. 09/842,146 filed Apr. 26, 2001.

BACKGROUND OF THE INVENTION

1. Field of the Invention

The present invention generally relates to an apparatus for improving signal-to-noise ratio and/or resolution of opto-electronic target image detection systems as well as the reliability and versatility of similar laser designator systems More specifically, the present invention adds a multi-faceted optical diverter in a system using a lens with a given aperture to focus one central beam of collimated light with a cross-section matching that aperture as it travels between a target and at least one opto-electonic device such as a laser or detector diode located at the focal point of the lens in its focal plane. The diverter includes facets that redirect similar collimated facet beams adjacent and parallel to the central beam which pass through the same lens aperture between the same target and a separate set of facet opto-electronic devices. These facet devices are located at other focal points of the lens in the same focal plane. The combination of all these beams defines a larger information relay beam. The electronic target signals in all of the beams are processed simultaneously thus providing a greatly improved information exchange. The opto-electronic devices may be light transmitters or receivers, e.g. light emitting diodes, lasers or detectors.

2. Description of the Prior Art

Automatic Target Recognition (ATR) is a desired technique for use in weapon systems to be used in the "digital battlefield" of the twenty-first century. No system now available allows for the combination of the various functions required for providing a fully functional and practical ATR system. Factors that are of importance include: detector signal to noise ratio, detector resolution, photon power projected by a laser designator on a target, and the coding of information projected by a laser designator on a target.

Most modem imaging sensors are designed to meet at least three performance lo parameters, including a minimum field of view, a minimum angular resolution, and a signal-to-noise contrast function which describes the system's ability to discern the contrast between a target and its background. As a general rule, a sensor's signal-to-noise ratio (SNR) can be improved by fabricating more sensitive detectors or increasing the optical aperture to collect more light. For most imaging systems, the fields of view, optical apertures, and detector sensitivities are compromises to meet hardware space requirements and to provide optimized performance under standard or most frequent conditions. In actual use, however, occasions will arise when an extra "boost" is needed to enhance certain aspects of image quality. In most cases the field of view and angular resolution can be modified using zoom optics or adding telescopic lenses. Enhancements to the SNR are more difficult, however, because most detectors cannot simply "boost" their signal levels without also increasing the noise present; and the latter is fixed by practical limits on the allowed aperture dimensions and overall design complexity. Searching techniques of prior art systems first utilize a wide field of view and then to get a better look at the target the operator switches or zooms to a narrow field of view. In imagers currently available, this puts more pixels on the target, but can result in an increased f-number and pixels that have more noise.

One method to enhance the SNR is to provide more detector elements to view the same image. This is achievable for linear scanning systems by aligning two or more identical linear arrays of detectors in parallel. The scanned image passes normally and quickly over each array of detectors, and the electronic signals from identical points in the scenery as viewed by different array detectors are then summed. This is often called "time delayed integration" (TDI), because there is a slight time delay as the image sweeps from one detector array to the next. TDI operates in synchronization with the scan rate, and is considered "real-time" al least for human viewing. This technique requires complex timing on the array readout, and obviously involves more complicated manufacturing processes to include the extra arrays. TDI is not practical for a two-dimensional staring array because it relies upon some method of scanning the scene.

Another technique, common to both linear array scanning and two-dimensional array staring sensor systems, involves electronically adding segments of imagery gathered from the same object or scene over time. Entire two-dimensional images are stored in an electronic frame memory, and then can be added together with specific image processing to enhance the SNR. This temporal integration can enable an increase in SNR of approximately the square-root of the number of image segments integrated. The problem with this technique is that neither the sensor nor target can be in relative motion; otherwise the shifts of object location, on the focal plane over time, will smear out image details as frames of imagery are summed over time.

Once a target is detected and identified by one system, the image of the target itself can be altered using a target designator to permit easy acquisition by much less sophisticated system. Most modern, target designators utilize at least one laser having a specific wavelength assigned for a specific target. Designators become more complex as multiple random factors and multiple targets make it harder for a weapon to acquire its intended target. The extremely short time intervals utilized for weapon execution also complicate designation. Often, it is not until an execution sequence is already in progress that the target is precisely determined. If two high cost weapon systems attack the same target, this is an unnecessary waste battlefield resources.

For imaging sensors, illumination appears to be an ideal technique, but has not yet been practically demonstrated. A popular illumination source involves sets of laser diodes or other types of illuminators. Each source requires an individual set of combining optics, which collimate a finite array of diode emitters. The larger the size of the emitter array, the greater the divergence angle of the exiting beam. This places a practical limitation on the output power that can be directed at a small target some distance away from the illuminator. The individual optics for the diodes themselves often possesses anamorphic optical powers to accommodate the varying divergences of diode output in the horizontal and vertical directions. Mismatches between the individual and combining optics often lead to additional distortion problems.

While the prior art has reported using enhancement of sensor resolution and target designation, none have established a basis for a specific apparatus and technique that is dedicated to the task of solving the particular problem addressed by applicant. Applicant provides a technique for improving sensor signal-to-noise ratio, without loss of time resolution, and in combination therewith a target designation technique, based on substantially the same optical hardware.

SUMMARY OF THE INVENTION

It is therefore one object of the invention to provide a method and apparatus for improving sensor signal to noise ratio and separately, or in combination, a similar method and apparatus for use as a target designator. According to the invention, there is disclosed an apparatus and technique for enhancement wherein several electro-optical devices, each of which represent the same pixel or group of target pixels, are mounted in the focal plane of the same collimating/de-collimating lens. A refractive or reflective non-focusing faceted diverting means is provided for folding substantially identical parallel closely spaced collimated light beams through this same lens along with the similar, parallel but un-diverted normal central beam between the target and the apparatus. Each of these beams uses the full aperture of the lens and focuses on a different electro-optical device in the focal plane of the assembly. These devices normally have optically active surfaces, such as anodes or cathodes which coincide with the foal plane, but can also communicate with the focal plane through the ends of an optical glass fiber or the like. The beams may be incoming or outgoing depending on the type of devices involved. The electro-optical devices may be diode photon detectors, light emitting diodes, laser diodes or other similar devices. The electro-optical devices preferably define at least one array on an integrated circuit chip. The chip may include both detectors and emitters on one or both sides of the chip and be rotatable to place either side in the focal plane. A central processing unit (CPU) with a power supply programs the excitation of these devices, monitors their response and stores any predetermined or new data presented on various targets.

When the electro-optical devices are light emitters, the lens assembly and faceted diverting means produce a single output beam representing the characteristics of all the emitters. The emitters can be identical resulting only in a more intense beam, e.g. in a LIDAR echo ranging system, or as a simple target designator for a weapon system. In both system the efficiency and reliability is improved by using emitters of different light wavelengths and or modulating them with codes that represent classes or specific targets and/or their most effective deterrent weapon systems.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention described herein provides a method and apparatus for improving the efficiency of target sensor and/or designator devices. The sensor devices may be level sensitive photo-diodes used as pixel detectors in electro-optical imaging devices or the less discriminating, but more sensitive photo-multiplier type Infrared Search and Track (IRS&T) sensors, which detect and display distant targets as a moving points. Both photo-diodes and laser diodes are inherently small, so that thousands can be placed on a one-inch square substrate with their photo-active surfaces defining a focal plane. Larger devices that are more sensitive or powerful can be coupled through a bundle of optical glass fibers the ends of which define a similarly small area of a focal plane.

There is described herein a sensor resolution enhancement scheme that does not sacrifice time resolution, but simultaneously and optically projects several identical narrow fields of view (NFV)s onto a system focal plane that accepts a wider, two-dimensional field of view (WFV). This can be useful for any visible, ultraviolet, or infrared sensor system. This can also be used to provide real-time single frame image integration to improve the signal-to-noise-ratio of a sensor. The same optical assembly that is used to divide the (WFV) into (NFV)s for several two-dimensional arrays, or single elements, of photon detector diodes in an imaging system can also be used in reverse to align the photon output from several two-dimensional arrays, or single elements, of photon emitter diodes.; such a system can be used to illuminate a distant target with increased brightness or a more complex spectrum. These systems will work best if the collimating optics provide a telecentric focal plane on the photo-active surfaces of the array of optical electronic devices involved, i.e. their photo-cathodes or photo-anodes.

Figure 1:
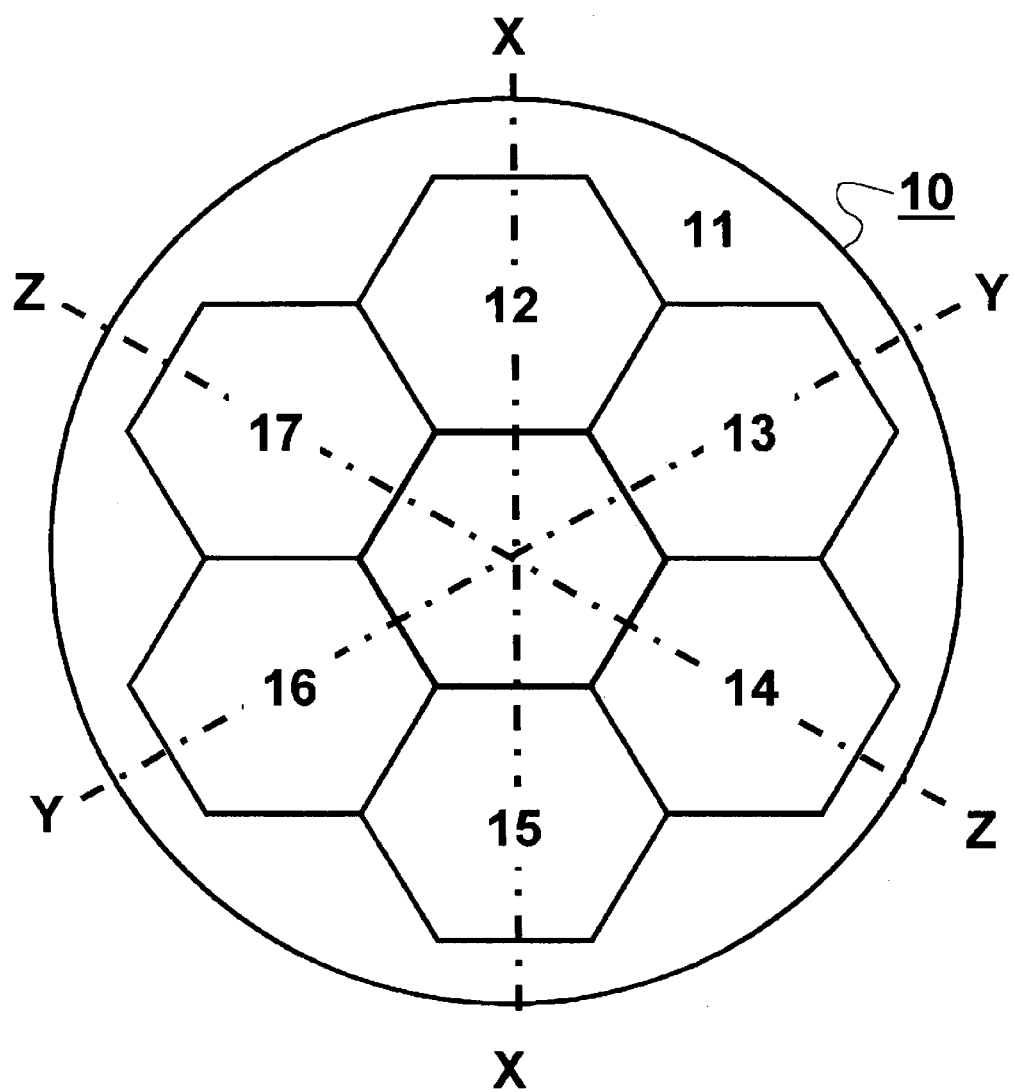
FIG. 1 is a face view of a faceted prismatic optical diverter utilized in many embodiments of the invention.

Referring now to the drawings, and more particularly to FIG. 1, there is shown a rear view of a faceted diverter 10. This element, which is the heart of applicants' invention, in this embodiment consists of a backing plate 11 and a number of prism facets 12–17. Which have equal shapes that approximate the aperture of the system to be improved and preferably, can be tessellated. These shapes include triangular, square or the hexagonal facets shown. These are arranged closely around a window, preferably of the same shape to establish a new larger relay beam aperture for the system. The center window passes the usual central beam that passes normally through the lens aperture, and is focused without deviation of its optical axis.

The facet prisms taper uniformly, from the thickest edge abutting the hexagonal window to the thinnest edge shown here as zero. For hexagons these edges are parallel straight lines. These facets pass beams similar to the central beam, but due to their high index of refraction, the optical axes of the facet beams are refracted to intersect a common cross-over point on the axis of the central beam in the center of the lens. The beams are thus diametrically transposed at the focal plane and their images inverted with respect to that of the central beam. By using a lens with the proper focal length, however, these hexagonal images can still be closely tessellated in the focal plane and electronically inverted after detection or before emission by the photo-electronic elements. As illustrated, the backing plate, preferably, extends under and adheres to the facet prisms to integrate the whole diverter. The plate may covert he central window or the plate material may be removed from that area. The surface of the diverter has main axes of symmetry that pass through the centers of the window and prisms, in this case axes xx, yy and zz. The outer edge of the plate preferably extends beyond the facets and is shaped to engage some type of mounting structure.

It is understood that the invention is not limited to the number or shapes of facets shown. Square facets have similar properties to hexagonal ones, but they do not use round lens apertures as efficiently. The optical axis of this diverter is normal to the thin plate and passes through the center of the hexagonal window coaxial with the central and relay beam optical axes. When substantially collimated light radiated or reflected from a small distant target on this optical axis encounters the plate, the plate defines the cross-section of a relay beam and, if provided with a stop can divide this beam into the central and facet beams. These beams may instead be defined by the facet prisms, facet reflectors or by the surfaces of opto-electronic devices in the focal planes of systems to be described, presently.

Figure 2:
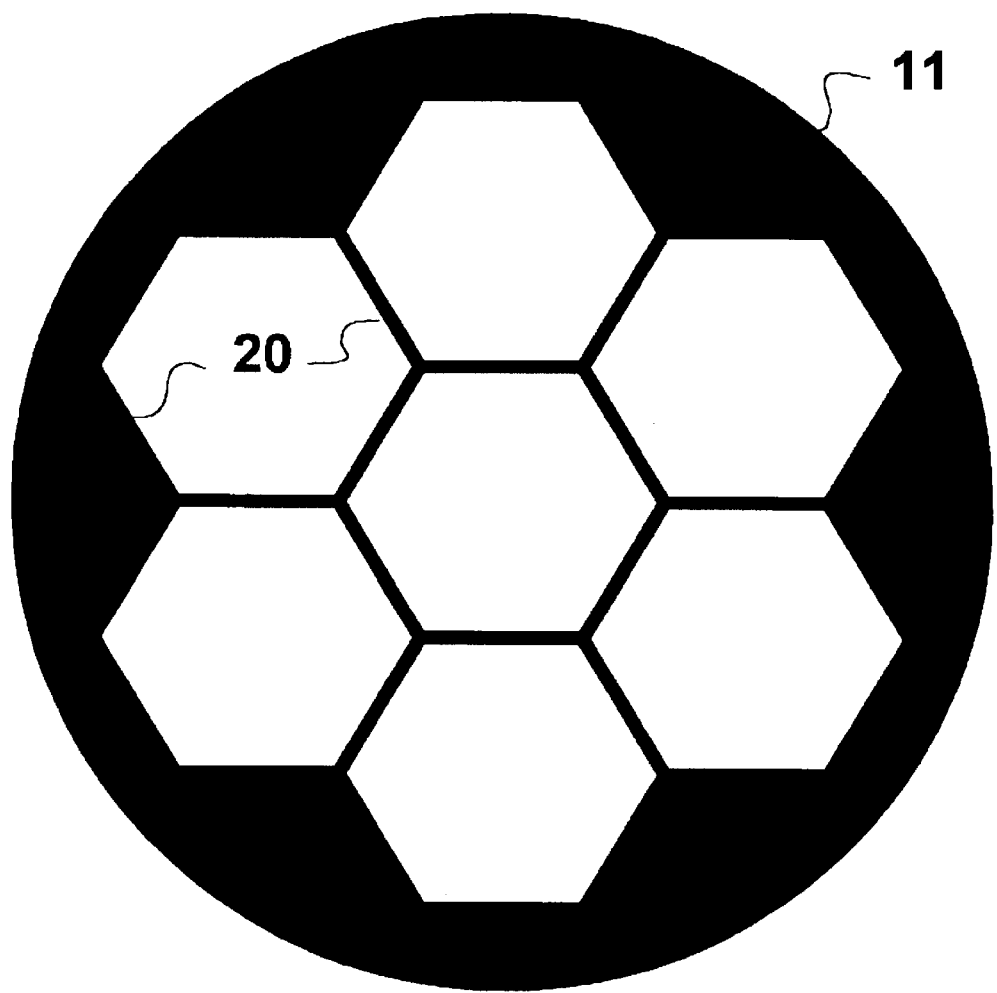
FIG. 2 is an opposite face view of the diverter from FIG. 1 to which has been added a stop that more precisely divides the relay beam into seven collimated light beams of hexagonal cross-section, all but the central one of which are diverted.
Figure 2A:
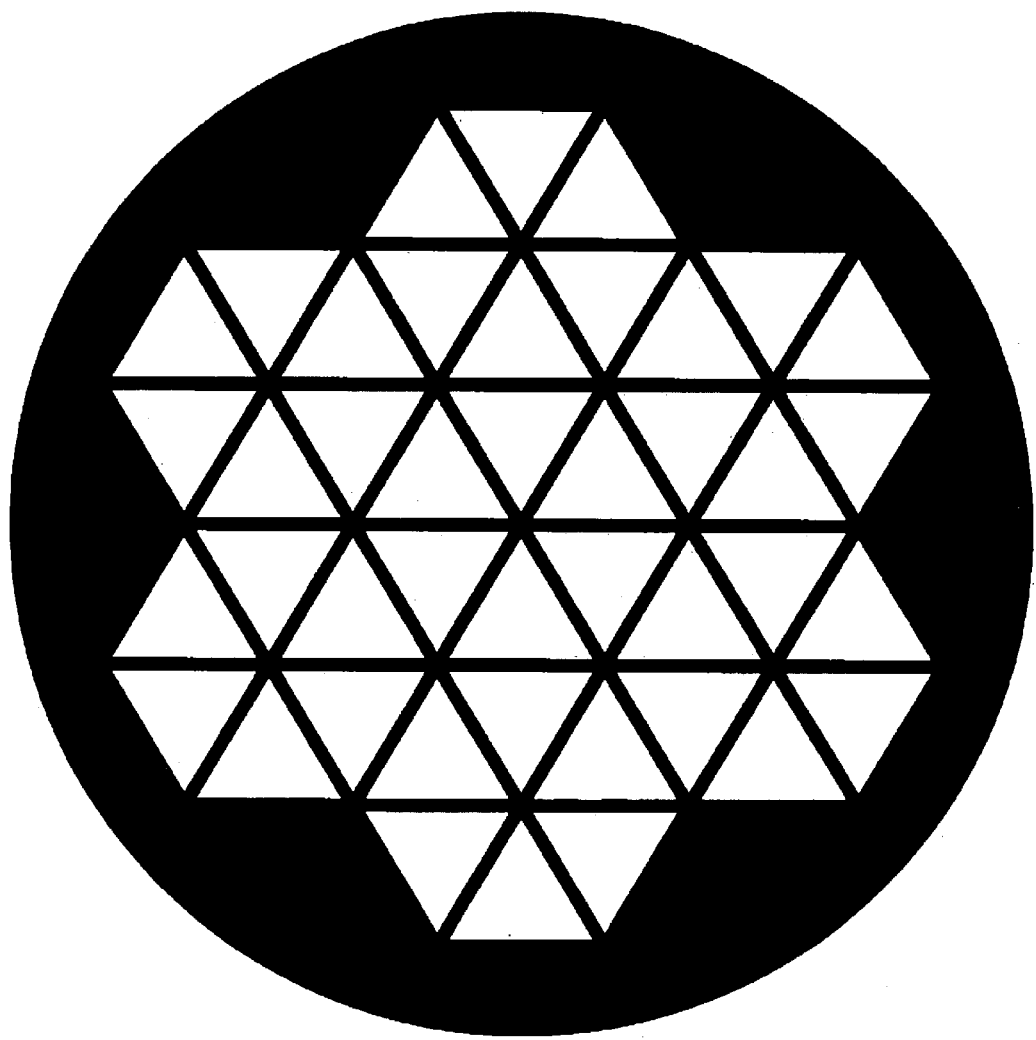
FIG. 2a is an opposite face view of the diverter from FIG. 1 to which has been added a stop that divides the relay beam into forty two beams of triangular cross-section, all but a central six of which are diverted.

FIGS. 2 and 2a show stop patterns that may be used with the diverter described above. This can be any opaque material 20 or 21 preferably attached to the opposite surface of plate 11 from the facet prisms. This slightly reduces and better defines the cross-sections of the beams. In FIG. 2a it is shown how the hexagonal beams may be further divided into six triangular beams. Each beam can then be diverted and focused with on a separate photo-active electronic device or element. A separate prism can be provided for each beam, but this would require six different groups of prisms. It is preferred that each group of six beams be treated like one hexagonal beam except in the focal plane. This requires only the six identical prisms shown in FIG. 2 or similar reflectors to be described later.

Figure 3:
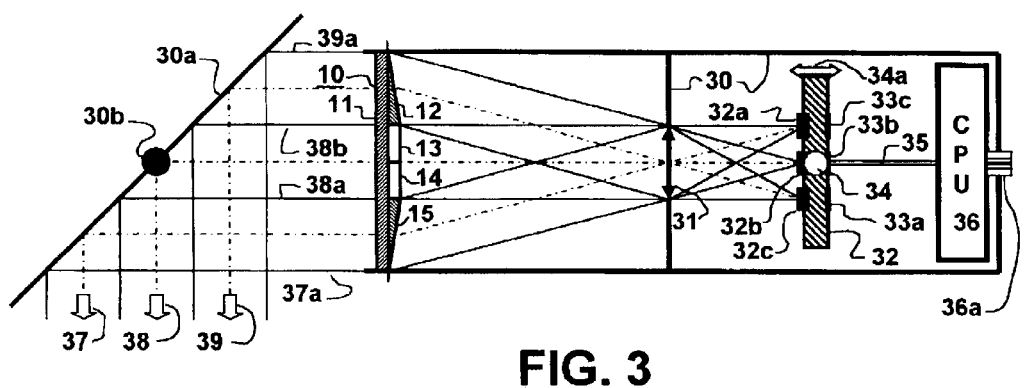
FIG. 3 is a cutaway edge view, along the symmetry axis XX showing the central and two of the six outer beam ray traces for the faceted prismatic diverter from FIG. 1, when used with seven light emitters and a collimating lens assembly as a target designator.

FIG. 3 shows a side view and optical ray trace of a system for target designation using the diverter element from FIG. 1. To support, align and protect the elements an opaque tubular housing 30 may be provided, which has a longitudinal center axis coaxial with the central optical axis. The diverter 10 is mounted coaxial to the housing axis near an open end of the housing. A lens 31 is coaxially mounted in the housing on the main optical axis at the cross-over point for the facet optical axes. An integrated circuit chip 32 is centered in the housing with a broad surface facing the lens in the focal plane. This surface contains the photo-active surfaces of laser diodes such as elements 32a–32c each centered on the axis of a different beam. The ray dashed traces show the paths of the center axes of the central beam 38 and two facet beams 37 & 39. The two unbroken rays 38a & 38b define the outer limits of the central beam and one outer limit of each of the facet beams. The two unbroken rays 37a & 39a define the remaining outer limits of the facet beams.

After collimation by the lens and deflection by the diverter three laser beams leave the designator, as indicated by the arrow heads on the center axes. These can be further reflected by scan mirror 30a which can be rotated by scan motor 30b to scan the target, if necessary. The entire housing also can be moved, using motors gimbals or other hardware well known in the art, to direct the beam in any direction for search and track systems, with or without a scan mirror. The dimensions used in this figure are misleading, but necessary for clarity. The housing has a much greater length to diameter ratio and the laser diodes are usually too small to be discerned by the naked eye. Very little refraction is required by the prisms and lens.

The opposite side of chip 32 may have a surface defined by the photo active surfaces of detector diodes 33a, 33b and 33c. These are arranged to provide the same pattern of images as the laser diodes. The circuit substrate can then be mounted on a pivot 34 and electrically fed through slip rings (not shown). It can be continuously rotated about a diametric axis normally intersecting the central optical axis. This periodically replaces one type of diode with the other. This mode of operation, wherein the target is alternately detected and illuminated with coded information from the detection, can be used in Infra-red Search and Track systems to designate targets for weapon systems. Coupled with Applicants diverter this system provides a very efficient target designator for numerous weapon systems operating simultaneously.

Figure 4:
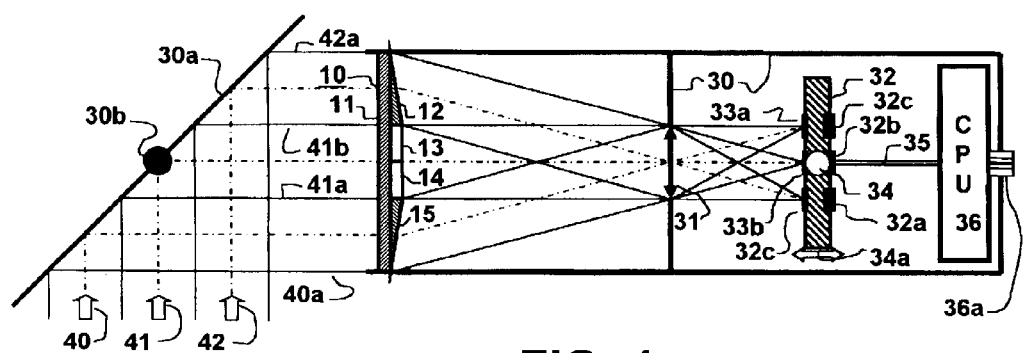
FIG. 4 is a cutaway edge view, along the symmetry axis XX showing the central and two of the six outer beam ray traces for the faceted prismatic diverter from FIG. 1, when used with seven photo-diodes, or other electronic light sensors, and a collimating lens assembly as a target detector.

FIG. 4 shows the same side view and optical ray trace of the system in FIG. 3, but with the circuit board 34 rotated 180° for target detection. The ray patterns for the beams are the same, but instead of leaving the housing, the beams 40–42 between limit rays 40a, 41a, 41b & 42a come from the target to the detectors. The central processing unit (CPU) 35 in both figures uses preprogrammed target data to synchronize the excitation of the diodes with the rotation of the circuit board, the housing and/or the scan mirror. This processor then compares the output of the detectors with its banks of target data and generates decision data to be relayed by the laser diodes. The CPU may also be connected externally through cable 36a to data storage devices, power supplies and to motors, like motor 30b, synchronizing the rotation of the housing and/or a scan mirror with the circuit board operation. As is well understood by those in the art, synchronization is best related to standard formats, which allow the use of existing video circuitry and standard video monitors.

Figure 5:
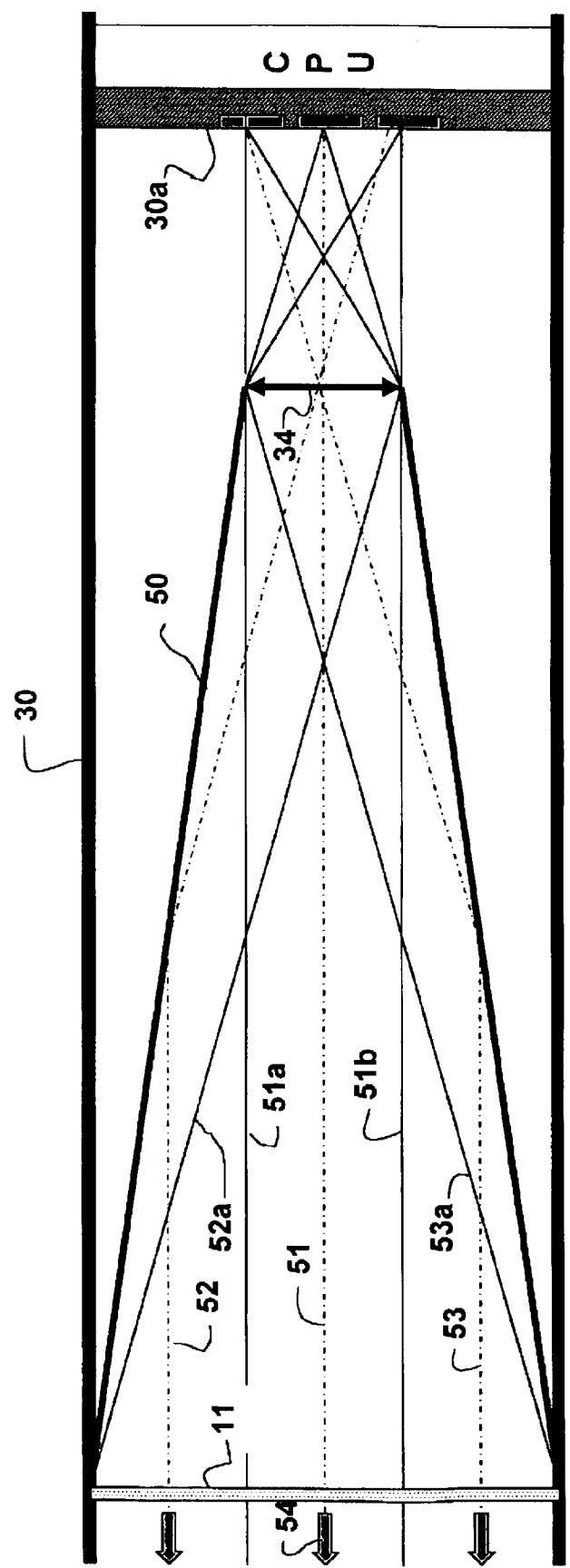
FIG. 5 is a side view of a long tapered thin walled tube or pipe, with a light reflecting interior surface, that can be used in place of the refractive diverter of FIG. 1, the ray patterns for the facet beams have a radial symmetry that appears twice in this side view, this occurring only when an even number of facet beams are selected from the relay beam, either by a stop or the active surfaces of a set of electro-optical devices.

FIG. 5 shows the side view and optical ray trace of a tapered tubular reflecting diverter 50 that can be substituted for the diverter from FIG. 1. The ray pattern is shown for either no defined facet beams or an even number, e.g. six facets. As in FIGS. 3 and 4, there are two diametrically opposed facet beams with central axes 52 and 53 as well as a central un-deviated beam with a central axis 51. The two unbroken rays 51a & 51b define the outer limits of the central beam and one outer limit of each of the facet beams. The two unbroken rays 52a & 53a define the remaining outer limits of the facet beams. The arrow heads, like head 54 indicate that board 30a is facing its lasers toward lens 34 providing a target designator. Reversing the arrow heads and substituting detectors for the lasers provides a target detector. Those skilled in the art will readily recognize that this concept can be extended to five, seven or as many more circumferentially spaced beams as desired. In its simplest mode, the tube, therefore, tapers from a radial width equal to the radial width of the central beam to three times that width. For a tube of round cross-section the radial width is half the diameter. For a tube with a regular polygonal cross-section the radial width is measured from the center of the tube normal to one side in the polygon. Regular polygons with an odd number of sides simply have radial symmetry rather than the diametrical symmetry shown. As with the FIG. 1 diverter the facet beams are diametrically transposed and radially inverted by reflection from the walls of the tube through a lens. There is less cross-sectional distortion of the beams if the tube is many times longer than its width. There is also less dispersion of the images in the focal plane and closer tessellation is easier to achieve.

Figure 6:
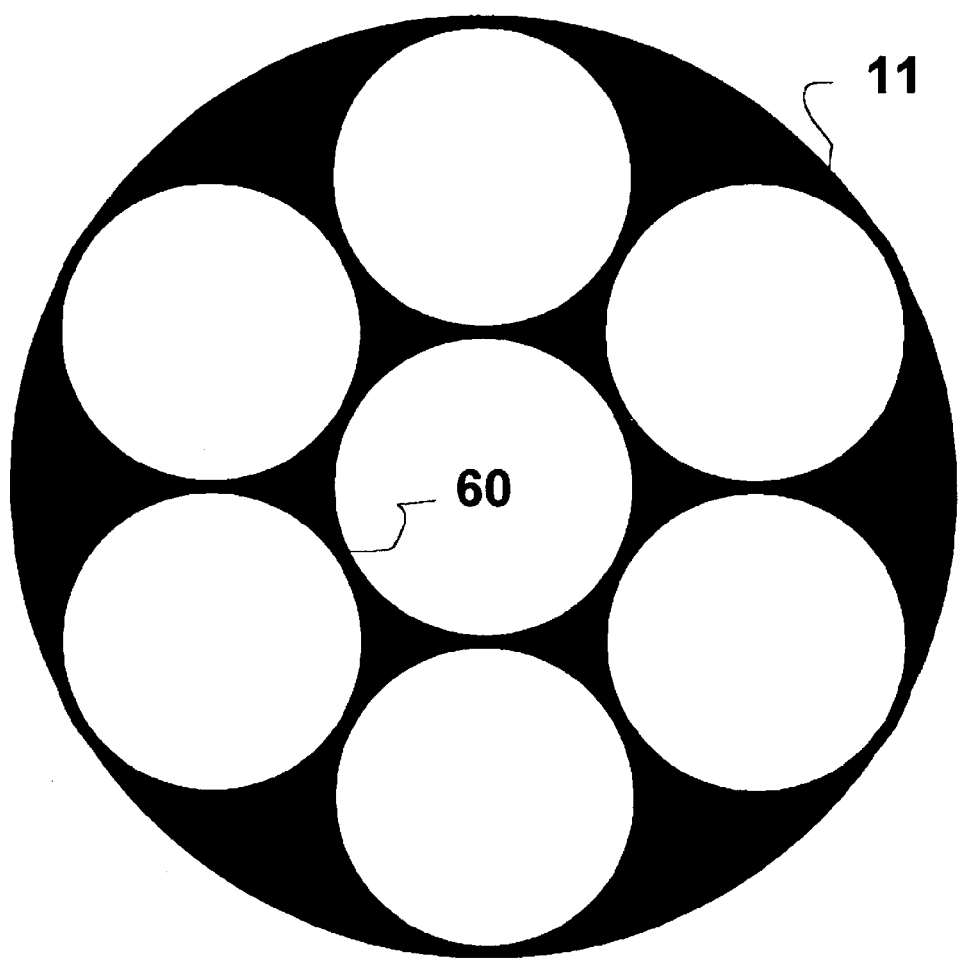
FIG. 6 is an end view of the tubular reflector of FIG. 5 with a large end stop similar to the stop in FIG. 2 that selects six facet beams are from the relay beam, the tube and the facet beams all have circular cross-sections.

FIG. 6 shows the end view of a tapered tubular diverter as shown in FIG. 5, wherein the cross-sections of the beams and the diverter are all circular. The beams may be defined by a stop made from the plate 11 covered with opaque material 60. If a relay beam is used without the stop shown, the tube and lens produce a circular image of the central beam surrounded by a ring image of the illuminated tube wall. If six photo-electric devices are then equally spaced around the area occupied by the ring image the effect will resemble, somewhat, that achieved with the system shown in FIGS. 3 and 4. The curvature of the walls, however, causes a focusing effect that distorts the images represented by the facet beams. If only laser diodes are used, this may be tolerated. But in an imaging system with photo detectors, where the goal is greater resolution and less noise, this can be a problem. Since the distortion is regular in form, it might be removed electronically at the expense of a more complicated system. Using the stop shown limits the distortion, if the detector surfaces are not uniform. It is not needed if uniform detectors are provided on a light absorbing substrate. The stop can also be replaced by using a light absorbing tube coated with mirrors having the shape of the intersection between a facet beam and the tube wall. This is true for any of the tubular reflectors which follow.

Figure 7:
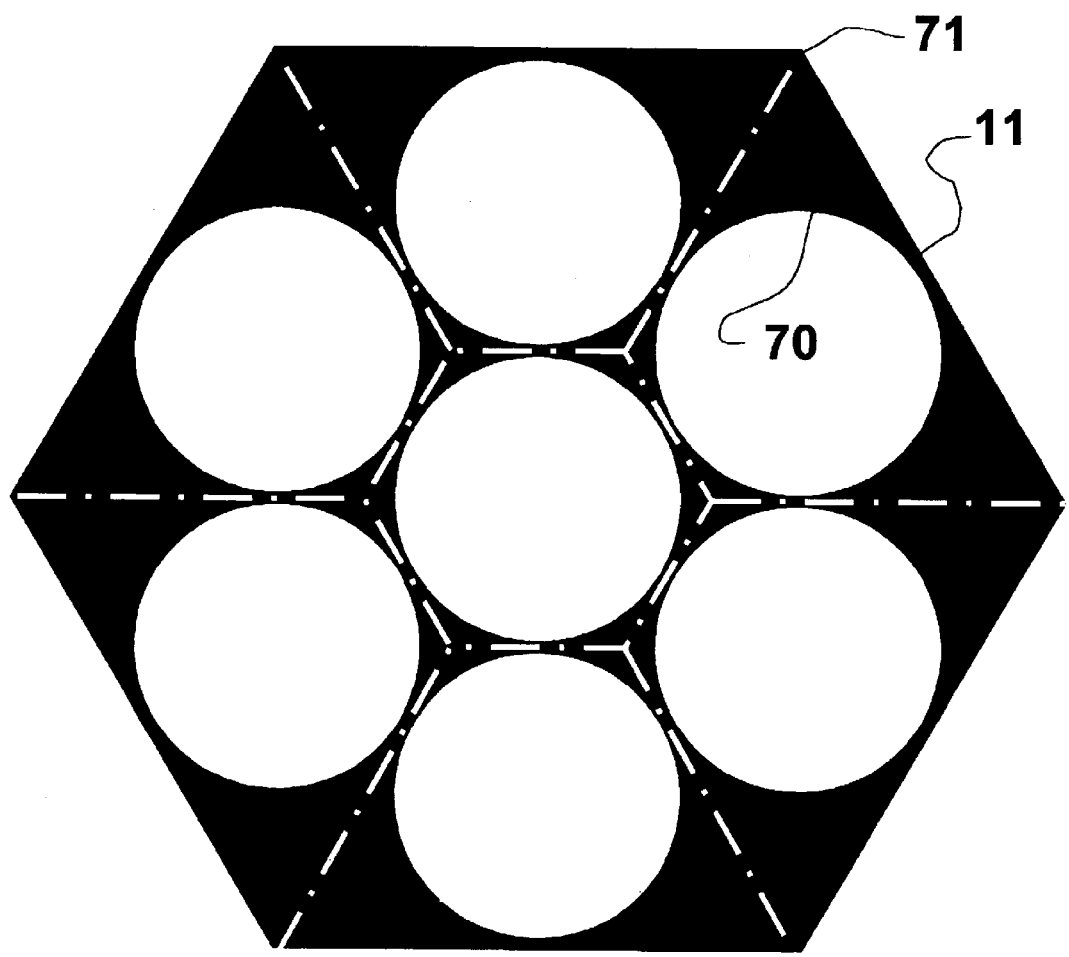
FIG. 7 is an end view of a tubular reflector similar to FIG. 6, wherein the tube and relay beam have a hexagonal cross-section and the facet beams have circular cross-sections.

FIG. 7 shows the end view of a tapered tubular diverter as shown in FIG. 5, wherein the cross-sections of the beams are circular and the cross-section of diverter is hexagonal. The plate 11 is cut to fit the hexagonal tube and coated with opaque material 70, as shown. The white dashed lines 71 indicate the hidden tube corners and small hexagonal lens opening. Here again, if a relay beam is used without the stop shown, a center hexagonal image is obtained surrounded by a hexagonal ring. Although the walls are now flat, there is a corner effect where the walls come together that distorts the facet images. Using the stop shown confines the facet beams to the flat center portions of the wall preventing any distortion by the corners. Stopping the central beam to a circular cross-section provides uniformity in the images and their tessellation in the focal plane. Circular images, however, cannot be as tightly tessellated as hexagonal, square or triangular ones.

Figure 8:
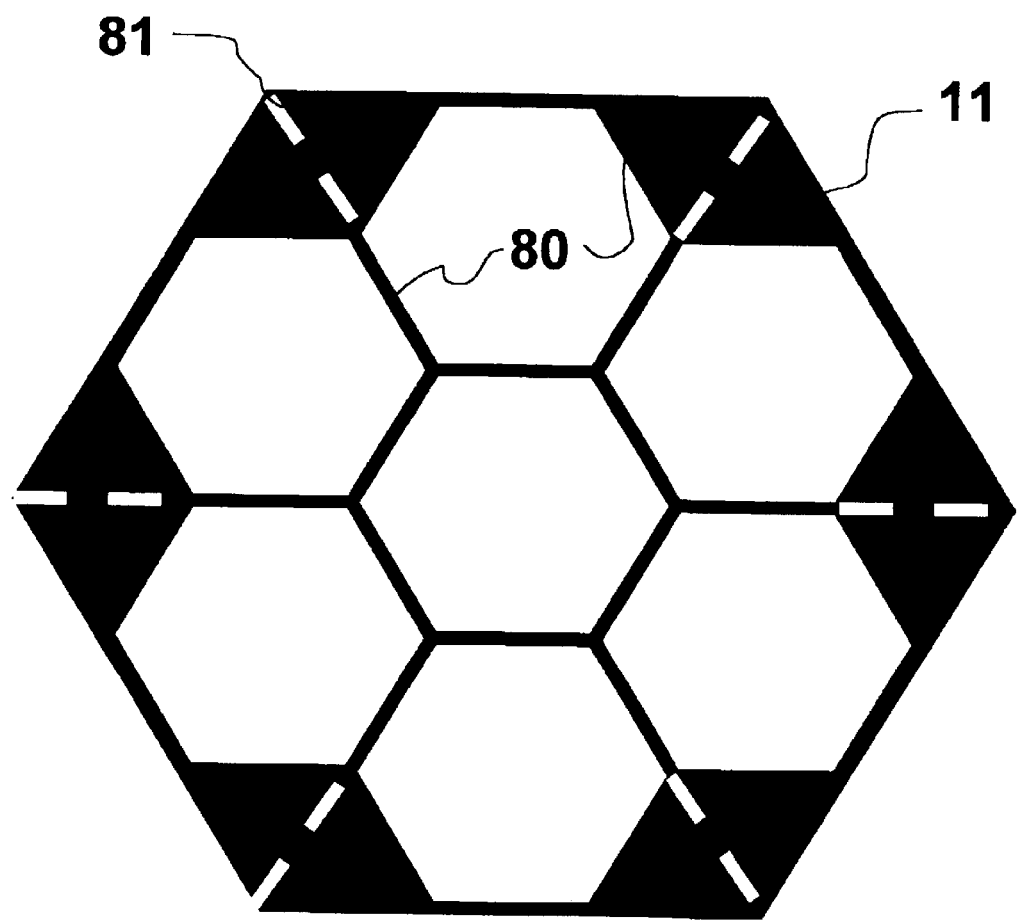
FIG. 8 is an end view of a tubular reflector, similar to FIG. 6. wherein the tube, relay beam and facet beams have hexagonal cross-sections.

FIG. 8 shows the end view of a tapered tubular diverter as shown in FIG. 5, wherein the cross-sections of the beams and the diverter are all hexagonal. The plate 11 is cut to fit the hexagonal tube and coated with opaque material 80, as shown. The white dashed lines 81 indicate the hidden tube corners. The stop prevents edge distortion and by using a long tube with a lens of the proper focal length the resulting hexagonal images can be very tightly tessellated.

Figure 9:
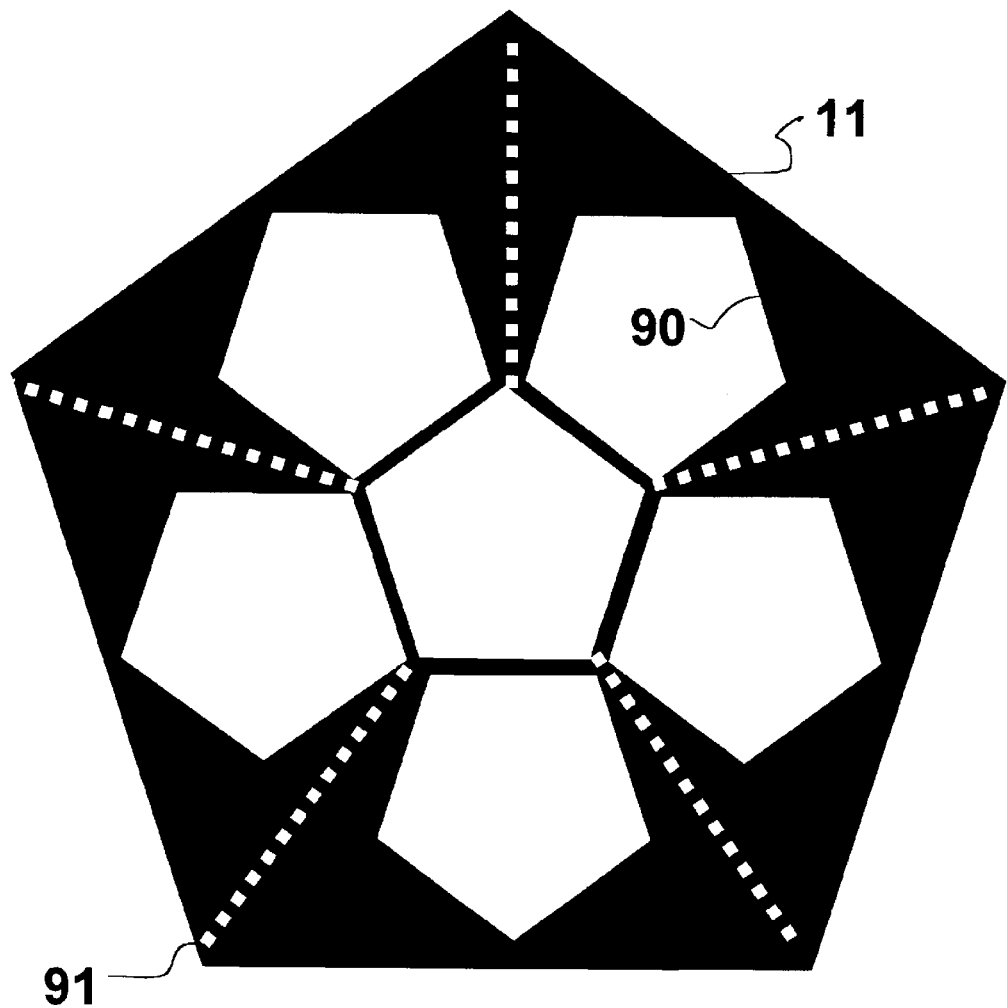
FIG. 9 is an end view of a tubular reflector, similar to FIG. 6. wherein the tube, relay beam and facet beams have pentagonal cross-sections.

FIG. 9 shows the end view of a tapered tubular diverter as shown in FIG. 5, wherein the cross-sections of the beams and the diverter are all pentagonal. The plate 11 is cut to fit the pentagonal tube and coated with opaque material 90, as shown. The white dashed lines 91 indicate the hidden tube corners. This system works, but their shape is not compatible with the shapes of most photo-electronic devices or that of their arrays. These shapes will not tessellate to fully cover a substrate. As with all the tube reflectors discussed, the central image is unchanged, while the facet images are inverted. This permits images with an odd number of sides to fit through the aperture. The images can then be inverted during the electronic signal processing in the CPU. This system produces six images, which make it the best choice for a specific enhancement system.

Figure 10:
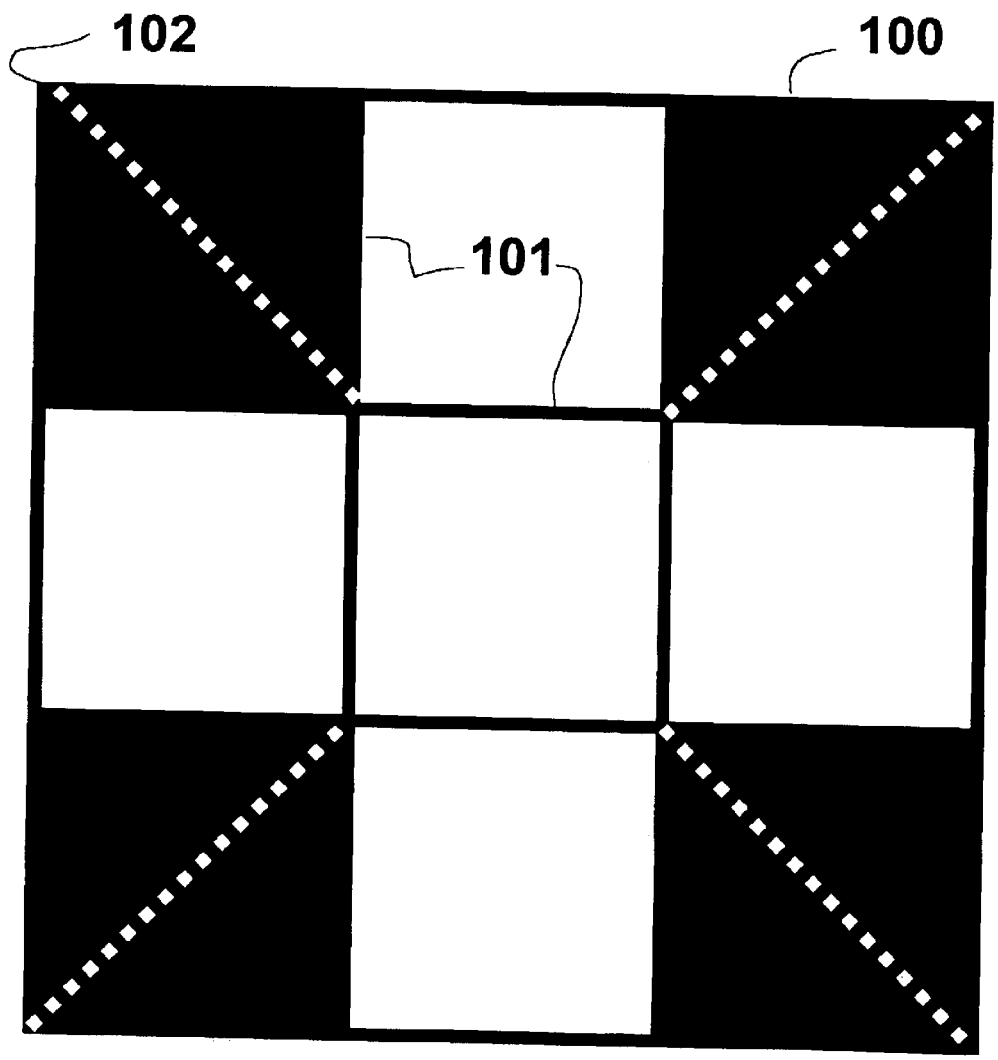
FIG. 10 is an end view of a tubular reflector, similar to FIG. 6. wherein the tube, relay beam and facet beams have square cross-sections.

FIG. 10 shows the end view of a tapered tubular diverter as shown in FIG. 5, wherein the cross-sections of the beams and the diverter are all square. The plate 100 is cut to fit the square tube and coated with opaque material 101, as shown. The white dashed lines 102 indicate the hidden tube corners. This is the most common configuration of tessellated light detecting diodes on integrated circuits (IC's). It is also the most common configuration of charge-coupled diodes (CCD's) used extensively in electronic photography. This system produces five images, which also may be the best choice for a different specific enhancement system.

Figure 11:
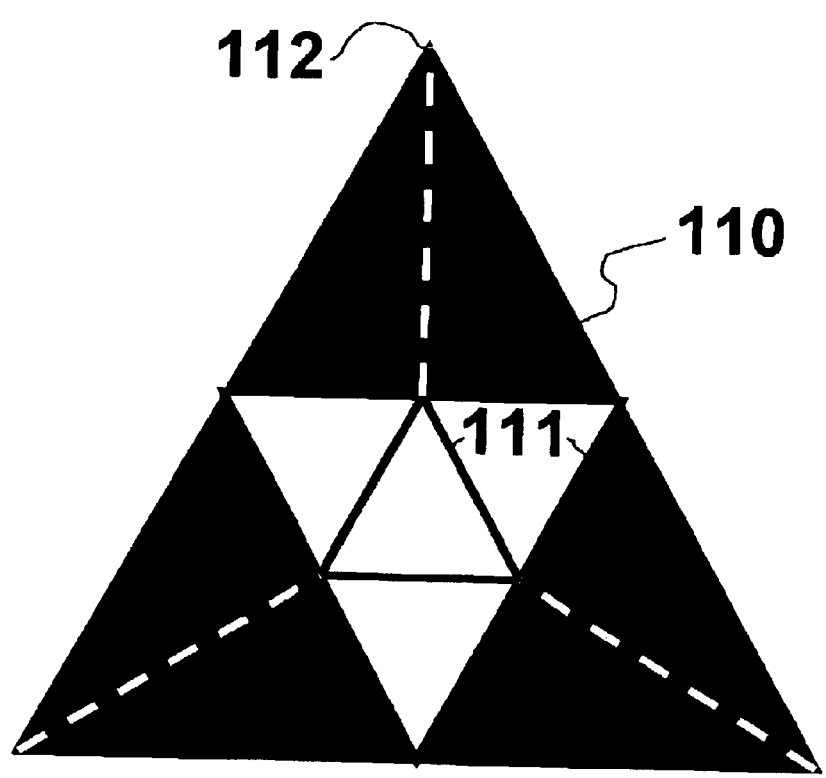
FIG. 11 is an end view of a tubular reflector, similar to FIG. 6. wherein the tube, relay beam and facet beams have triangular cross-sections.

FIG. 11 shows the end view of a tapered tubular diverter as shown in FIG. 5, wherein the cross-sections of the beams and the diverter are both triangular. The plate 110 is cut to fit the square tube and coated with opaque material 111, as shown. The white dashed lines 112 indicate the hidden tube corners. Unfortunately these four images make poor use of a round lens aperture, but the triangular shape provides a strong tube for rough environments. Four images also may be the best choice for a different specific enhancement system.

Figure 12:
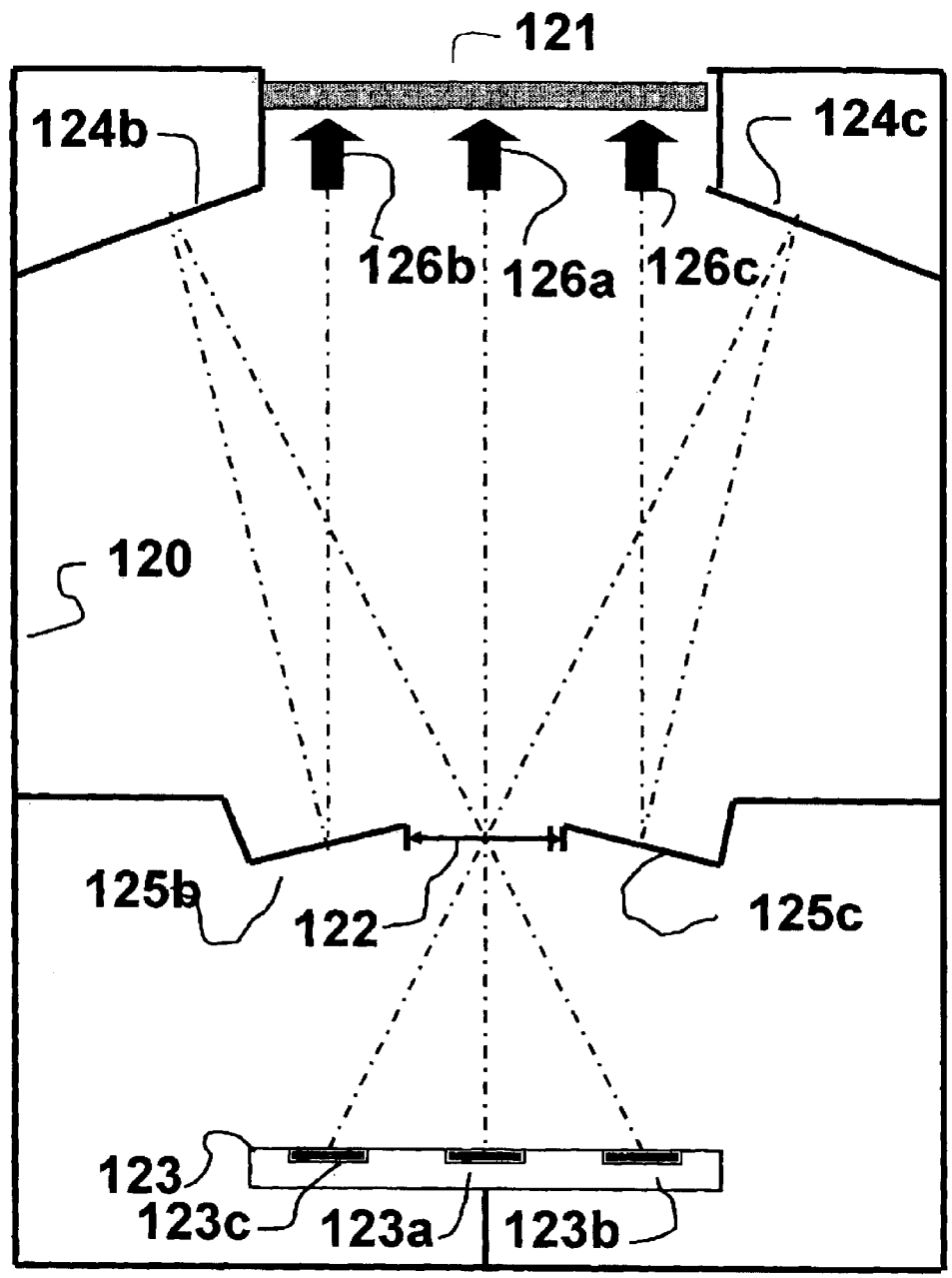
FIG. 12 is a side view of a reflexive reflector type diverter in a target designator, showing a central beam and two pairs of the reflectors as used in a diverter with an even number of off-center facet beams, and wherein the diametrical positions of the facet beams are inverted by the reflectors.

FIG. 12 shows a side view and optical ray trace of a system for target designation using a faceted reflex reflecting diverter. The diverter is mounted in a housing 120, preferably of circularly cylindrical shape. The inside of the housing has a greater diameter than the relay beam with an open and a closed end. A window 121 is mounted in the open end. A lens 122 is centered on the axis of the housing near the closed end. A circuit board 123 carrying a central laser diode 123a and at least two facet lasers 123b–123c is centered in the housing between the lens and the closed end, as in FIG. 3. As before the photo-active surfaces of the laser diodes lie in the focal plane of the lens. This board may also carry detectors on the opposite side and be rotatable as in FIG. 3. The central laser, as before, emits a cone of radiation that is collimated into a beam by the lens. This beam passes un-deflected through the window. Each facet laser creates a similar beam. For clarity only the central axes of these beams are shown. The facet laser beam axes are redirected by mirrors 124b–124c and mirrors 125b–125c creating exit beams 126b–126c parallel to central beam 126a. Similar laser diodes and mirrors on other symmetrically located radii of the housing create additional beams to complete the relay beam. Again a deflection mirror as in FIG. 3 can be used beyond the window 121 to direct the relay beam to the target and scan it, if desired. The cross-sections of the beams can be limited by a stop on the window, the reflective area of the mirrors and/or a stop at the lens. For example, the mirrors may be hexagonal platings on a light absorbent base layer of metal or plastic. The base layer could then be shaped like six pieces of a pie and joined at their edges to one another and the inner wall of the housing. For simplicity the same shape could be stamped from a thin sheet of reflecting metal and the stop pattern painted on, if desired. Those skilled in the art will recognize how this same technique could be extended to additional concentric rings of reflectors to produce more facet beams and a larger relay beam, if desired.

Figure 13:
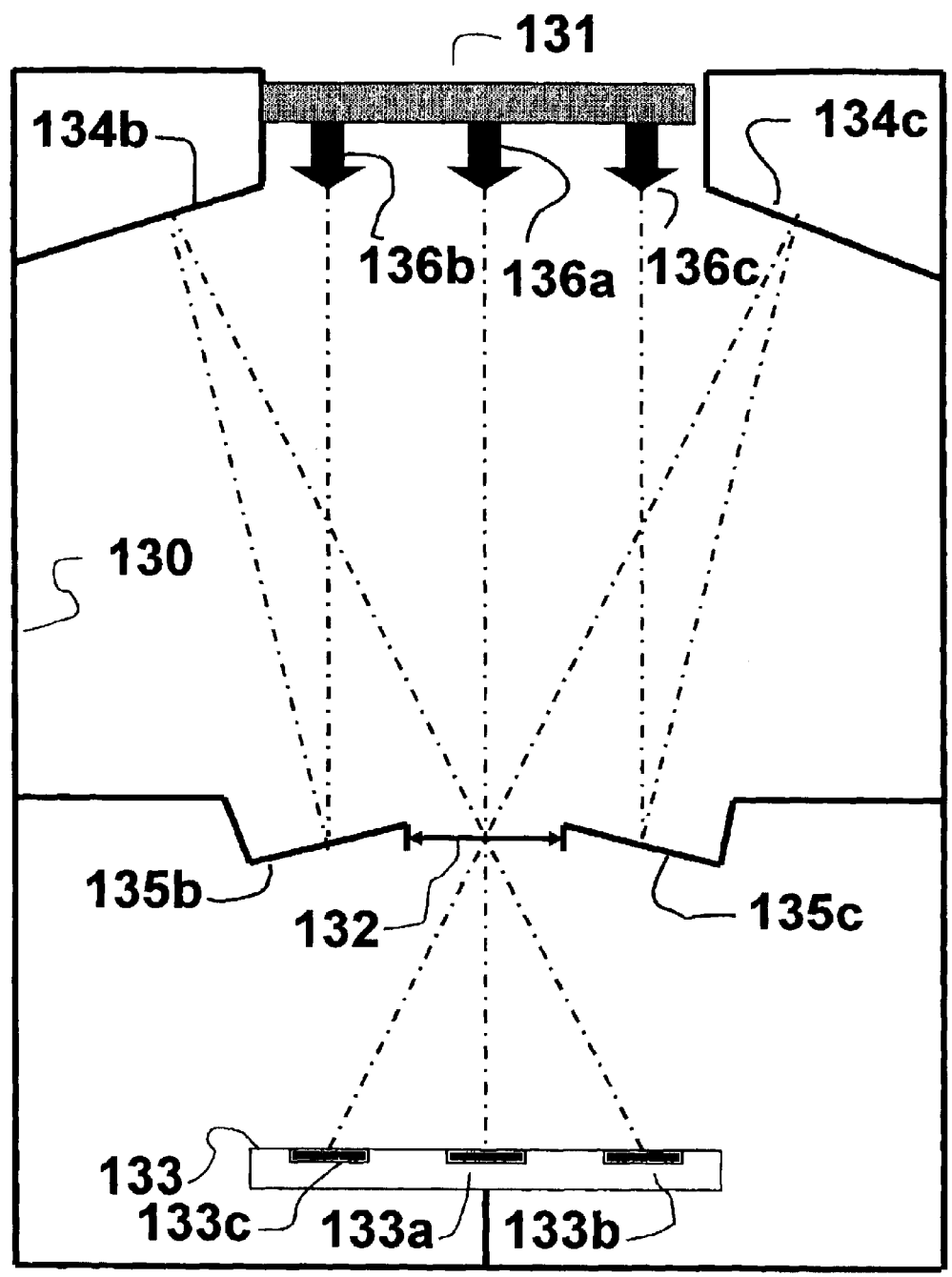
FIG. 13 is a side view of a reflexive reflector type diverter in a target detector, showing a central beam and two pairs of the reflectors as used in a diverter with an even number of off-center beams, and wherein the diametrical positions of the facet beams are inverted by the reflectors.

FIG. 13 shows a side view and optical ray trace of a system for target detection using a faceted reflex reflecting diverter. The device is completely similar to that in FIG. 12, except that the relay beam comes from the target through window 131 creating the central and facet beams 136a–136c. As before the central beam passes through lens 131, with its axis un-deviated, to a focal point on the surface of circuit board 133 containing a central photodiode detector 133a. The facet beams are reflected first by mirrors 134b–134c and then mirrors 135b–135c through the same lens to facet detectors 133b–133c. As previously indicated in FIG. 3, the circuit board may be mounted to rotate about an axis normal to the housing axis and have lasers on the side opposite the detectors, which are non-functional when they face the closed end of the housing. Obviously a deflection mirror can also be added beyond the window for target tracking and scanning purposes.

Figure 14:
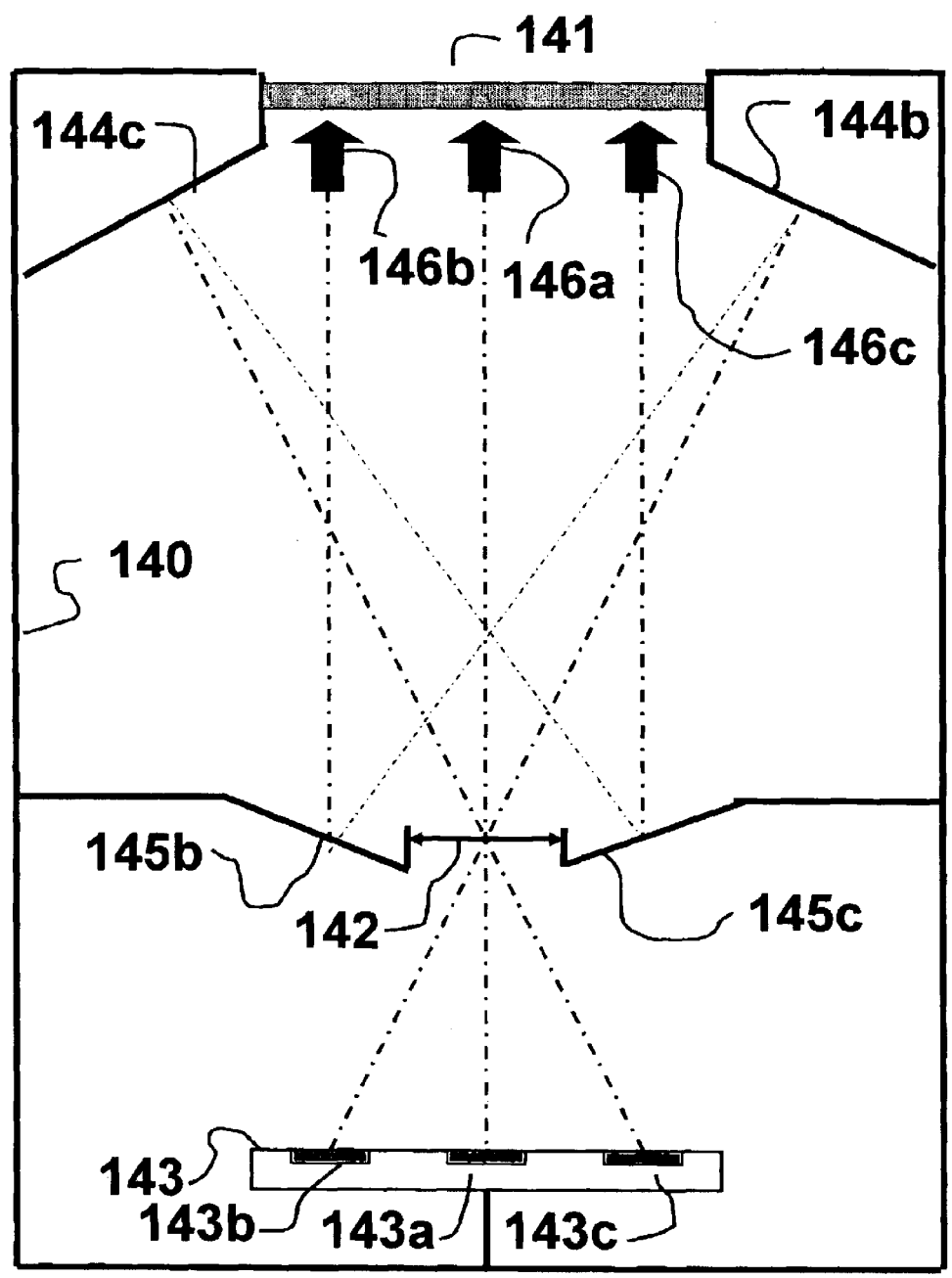
FIG. 14 is a side view of a reflexive reflector type diverter in a target designator, wherein the diametrical positions of the facet beams are not inverted by the reflectors.

FIG. 14 shows a side view and optical ray trace of another system for target designation using a faceted reflex reflecting diverter. This system is also very similar to the system in FIG. 12. Elements 140–143 are equivalent to elements 120–123. Mirrors 144b, 144c, 145b and 145c, which replace mirrors 124b, 124c, 125b and 125c, however, are disposed at different angles to the housing axis. Mirror 144b now deflects the axis of beam 146b to mirror 145b located where mirror 125c appears in the previous figure. The same relationship is true for mirrors 146c, 145c and 125b. The only noticeable difference is that the facet beams in FIG. 12 are diametrically transposed, while in FIG. 14 they are not.

Figure 15:
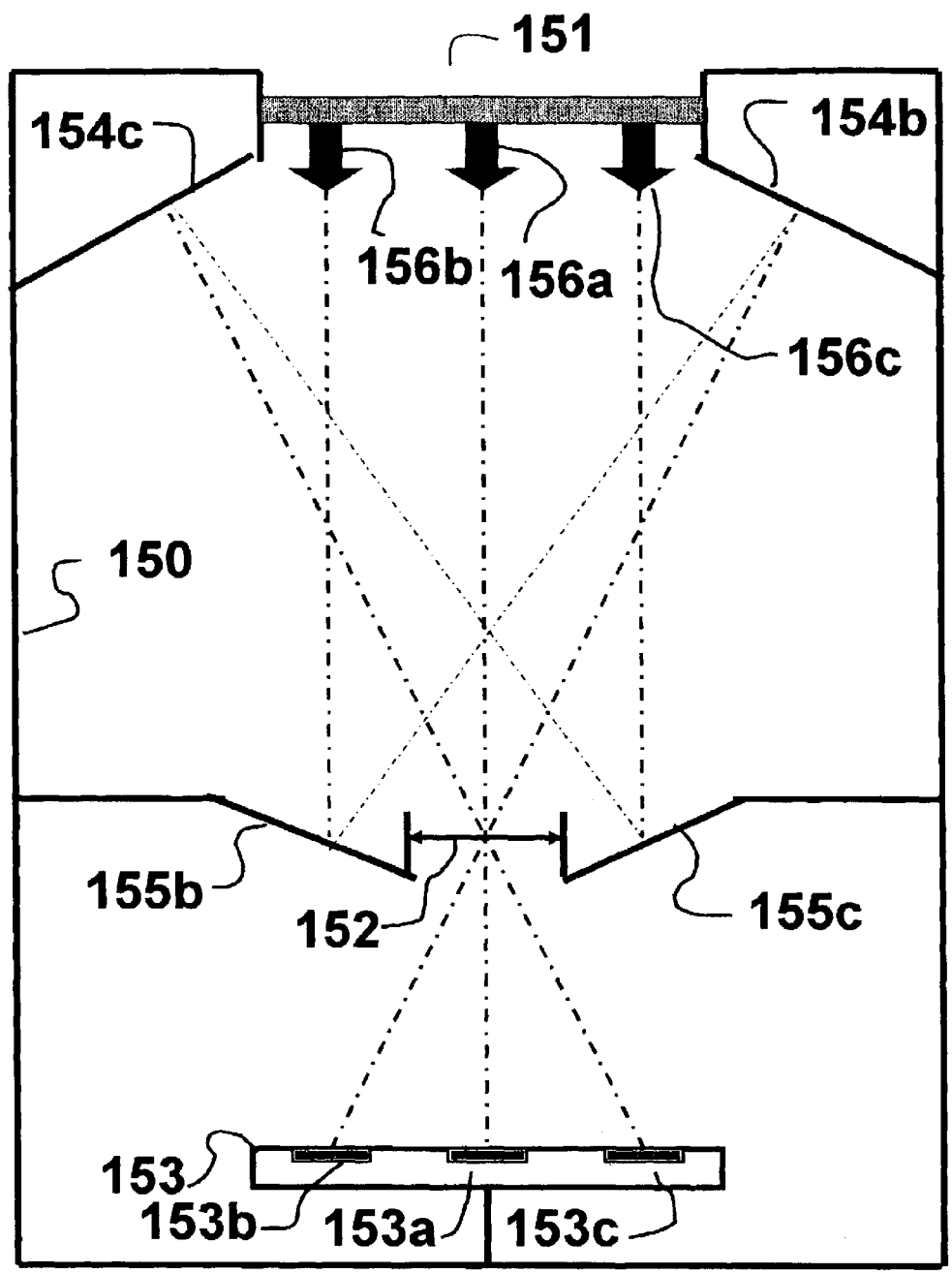
FIG. 15 is a side view of a reflexive reflector type diverter of FIG. 14 in an image detector, wherein the diametrical positions of the facet beams are not inverted by the reflectors.

FIG. 15 shows a side view and optical ray trace of another system for target detection using a faceted reflex reflecting diverter. This system is very similar to the system in FIG. 13. Elements 150–153 are equivalent to elements 130–133. Mirrors 154b, 154c, 155b and 155c, which replace mirrors 134b, 134c, 135b and 135c, however, are disposed at different angles to the housing axis. Mirror 154b now deflects the axis of beam 156b to mirror 155b located where mirror 135c appears in the previous figure. The same relationship is true for mirrors 156c, 155c and 135b. Again the only noticeable difference is that the facet beams in FIG. 13 are diametrically transposed, while in FIG. 15 they are not.

The concept can be carried further using heptagons, octagons, nonagons, etc. One particular arrangement that seems promising is a three by three square of nine smaller squares. The beam through the center square would be un-deviated, as above. The facet beams could be deviated by one of two types of square prisms. One would slope from side to side and the other would slope from corner to corner. Beyond this another arrangement that seems promising is a five by five square of twenty five smaller squares. The facet beams could be deviated by six types of prisms.

Figure 16:
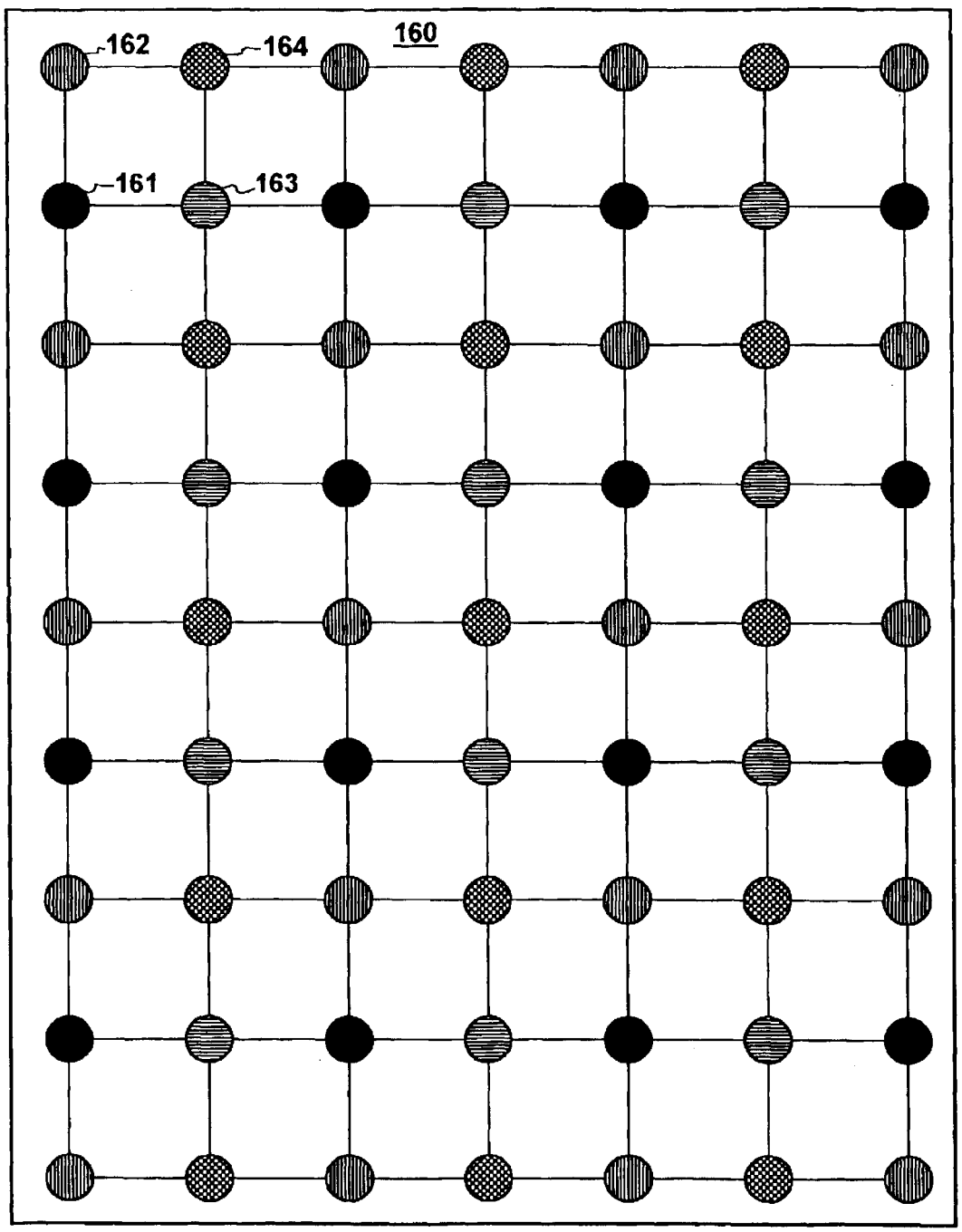
FIG. 16 is a pixel map of an improved image that can be produced by many of the detection systems shown in the above figures.

FIG. 16 shows the pixel pattern 160 of an enhanced image, readily accomplished with applicants' diverter. The image is formed by an overlapping pattern of pixels 160 generated by four standard square diode arrays. The black pixels 161 represent a basic image as produced, for example, by scamming a moving image over a single straight line array of detectors or focusing a fixed image on a two-dimensional staring array. Pixel groups 162–164 each form an overlapping pattern with their pixels respectively centered between pixels 161 horizontally, vertically and diagonally. The images for the above pixel pattern can be generated using a triangular facet diverter, as shown for example in FIG. 11, or any other diverter disclosed herein. Scanning a triangular image with a line array is not very efficient, but triangular staring arrays could very efficiently provide all of the required pixels for the pattern in FIG. 16. Using a square detector array with triangular images would involve not using some of parts of the images or some of the diodes. The image provided by the diverter of FIG. 11 matches the standard square diode configuration and provides an extra image. The extra image could be electronically combined with the image from the 161 pixels, for example, to improve the signal to noise ratio of the final image. The spacing of the pixel groups can be provided by slightly shifting the arrays with respect to their images or by electronically delaying the video signals in the CPU. This may be considered a type of spatial "dithering" resembling temporal "dithering", where the image and detectors are in relative motion to provide more samples. This spatial approach avoids smearing in the image.

Figure 17:
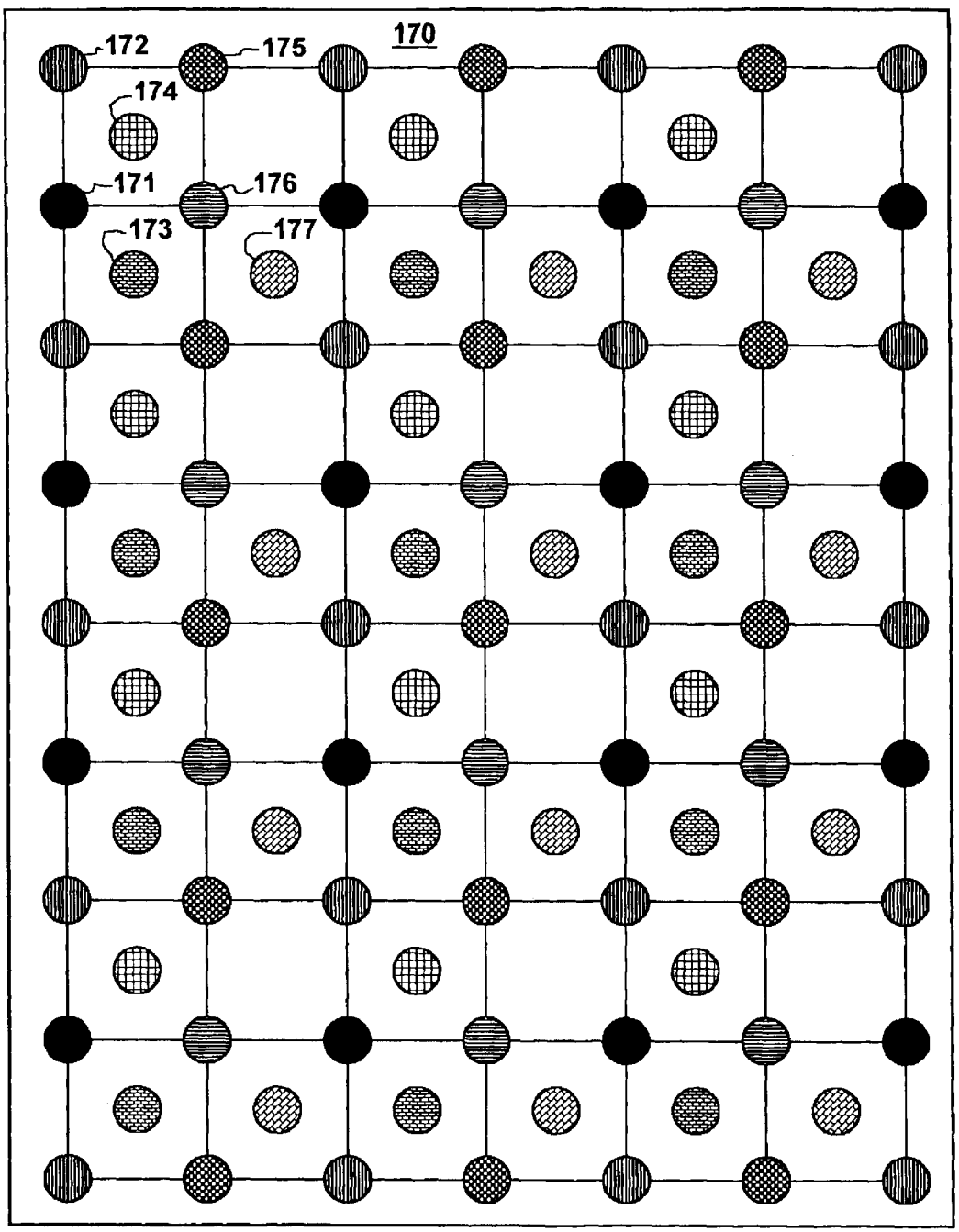
FIG. 17 is a pixel map of an improved image that can be produced by the hexagonal detection systems shown in the above figures.

FIG. 17 shows an overlapping pattern of pixels 170 generated by seven diode arrays to provide an image with much greater resolution than was achieved in FIG. 16. Each array supplies one of the pixels 171–177. This pattern is well suited for diverters that use hexagonal images. This pattern is one pixel shy of providing a completely uniform final pixel image, but this in no way diminishes the excellent visual presentation afforded by the redundant information present. If the image is used for target analysis the benefits of the new information are directly proportional to the number of extra pixels. The three by three or five by five square facet beam arrangements described above can easily generate the more complete eight pixel version of this pattern and even more complex patterns as well.

Figure 18:
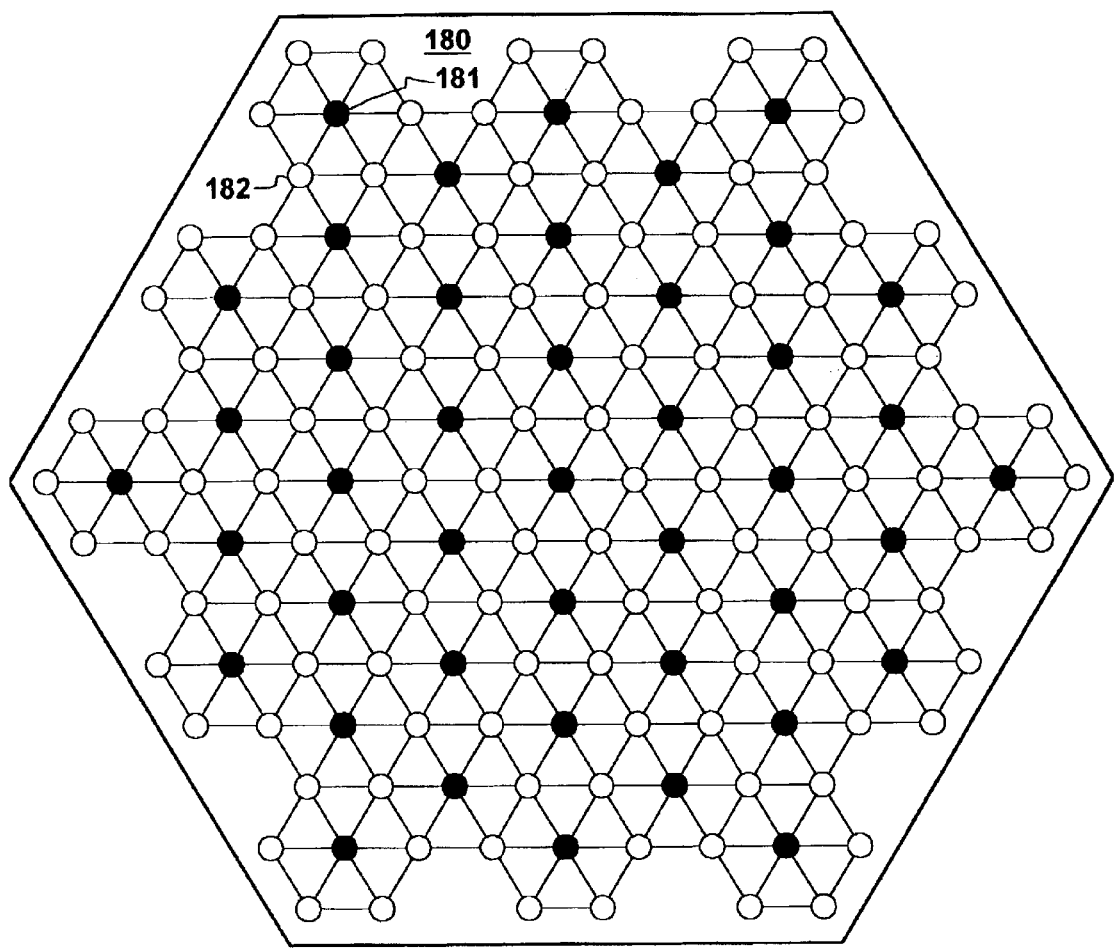
FIG. 18 is a pixel map of an improved image that is formulated for the hexagonal detection systems shown in the above figures.

FIG. 18 shows a special overlapping pattern of pixels 180 generated by the hexagonal seven image diverter discussed above. As before the black pixels 181 represent the basic image pixels. These are surrounded by six additional pixels 182 shown white for contrast. In a visual presentation, for example, the practice of overlapping two or more fields per frame may be employed. The lines of these fields will then overlap for two thirds of their pixels to provide a flicker-free image on a short persistence phosphor screen with improved S-N-R and contrast. A staring array built around this geometry would provide much improved image quality and detail. Additional seven pixel groups may be added to give the display or detector array any overall size and shape.

The beauty of the overall concept involved in this invention is the improved image quality achieved using the same lens. A special quality of a lens is its speed as expressed by its f-number, low f-numbers indicating the best lenses. A theoretical lower limit of this quality is f=1 or when the diameter of the lens equals its focal length. This value is approached only in very large and heavy lenses. The present invention provides an artificially induced improvement in the f-number by multiplying the number of images formed by the lens and adding them electronically.

While this invention has been described in terms of preferred embodiment consisting of an apparatus and technique, those skilled in the art will recognize that the invention can be practiced with modification within the spirit and scope of the appended claims.

What is claimed is:

1. In a target identification system wherein a housing coaxially supports a telecentric lens element near a central electro-optical element at one end of a central optical axis with the opposite end of said central axis intersecting said target, and wherein the aperture of said lens limits the small cross-section of a collimated central light beam path for transmission of information along said central axis between a first coaxial spot on said target and a second coaxial spot on said central element, the improvement comprising:

n additional electro-optical elements mounted in said housing, n being a whole number greater than zero, regularly spaced around said central element in close proximity thereto with their n optically active surfaces in the focal plane of said lens element, the centers of said n active surfaces defining n last straight line segments of a facet axis through the center of said lens, said lens aperture limiting the size of facet beams on said last segments to said small cross-section; and a faceted beam diverter mounted in said housing, between said target and said lens to redirect each of said facet beam axes into a series of segments including said last and at least a first segment lying in the same axial plane with said central axis, said diverter providing a facet element, having at least said small cross-section, between each contiguous pair of segments, said first segment being spaced a facet beam width from and parallel to said central axis, said central and facet beam paths thus being combined to form a relay beam path with a large cross-section n+1 times said small cross-section.

2. An identification system according to claim 1; wherein:

said facet elements are prisms, with dielectric constants substantially greater than one, having two broad flat faces centered on said facet axis, said faces being sufficiently inclined to one another to redirect each said facet axis bilaterally between said first and last facet axes.

3. An identification system according to claim 1; wherein: said facets elements are inside reflective wall portions of a tubular diverter, at least twice as long as its width, coaxial with said central axis and having a regular cross-section which tapers from a large end aperture abutting and at least equal to that of said relay beam to a small end aperture abutting and substantially equal to the aperture of said lens.

4. An identification system according to claim 3; wherein: the inner cross-section of said diverter is circular.

5. An identification system according to claim 3; wherein: the inner cross-section of said diverter is hexagonal.

6. An identification system according to claim 3; wherein: the inner cross-section of said diverter is pentagonal.

7. An identification system according to claim 3; wherein: the inner cross-section of said diverter is square.

8. An identification system according to claim 3; wherein: the inner cross-section of aid diverter is triagonal.

9. An identification system according to claim 1; wherein: said housing is an opaque tube having a cross-section at least as large as said relay beam path, the end thereof nearest said central electro-optical element being closed with an opaque wall.

10. An identification system according to claim 9; wherein:

the open end of said housing is covered by light stop that divides said relay beam path into n+1 central and facet beam paths.

11. An identification system according to claim 1; wherein:

said facet axes include a second segment between said first and last segments;

said last segments extend to folding points inside said housing spaced normally half the width of said central beam path outside of said relay beam path;

said facets are primary and secondary thin flat reflectors having the same cross-section as said central beam path, said primary reflectors being located between said first and second segments adjacent the edge of said lens and said secondary reflectors being centered on said folding points.

12. An identification system according to claim 1; wherein:

a scanning mirror means is mounted on said housing centered on said central axis at a point near said diverter where said relay path is undiverted to scan said relay beam over said target in one or more directions.

13. An identification system according to claim 1; wherein:

a central processing means is mounted in said housing between said central electro-optical element and said opaque wall to control activation and monitoring of all of said electro-optical elements.

14. An identification system according to claim 1; wherein:

all of said electro-optical elements are laser diodes.

15. An identification system according to claim 1; wherein:

all of said electro-optical elements are photo-diodes.

16. An identification system according to claim 1; wherein:

said electro-optical elements are a mixture of laser diodes and photo-diodes.

17. An identification system according to claim 14; wherein:

said laser diodes emit different frequencies;

said central processing means energizes said lasers according to a pattern of different frequency signals preassigned to said target.

18. An identification system according to claim 15; wherein:

said central processing means combines the output of said diodes in order to increase the signal-to-noise ratio and contrast of their output.

19. An identification system according to claim 16; wherein:

said central processing means alternately detects and illuminates said target designating it for a preselected weapon system.

20. An identification system according to claim 15; wherein:

said central processing means spatially dithers the output of said diodes to improve the resolution of the target image.

21. A method for effectively increasing the f-number of a lens having an optical axis mounted in a housing providing a lens aperture centered on said axis with area of A and which focuses a central collimated beam of light coaxial with said axis on its image plane, comprising the steps of:

A. forming an aperture in one end of said housing on said optical axis at least n+1 times the aperture of said lens to admit a relay beam of collimated light centered on said axis;

B. separating said beam into said central beam and n facet beams parallel to said central beam all having cross-sectional areas substantially equal to A;

C. redirecting said facet beams to pass through the center of said lens simultaneously with said central beam forming n+1 light images on said focal plane;

D. detecting said light images as electronic images;

E. combing all of said electronic images into a single electronic image; and

F. converting said single image to a light image.

* * * * *